United States Patent
Mann

(10) Patent No.: US 6,415,243 B1
(45) Date of Patent: *Jul. 2, 2002

(54) PERFORMANCE MONITORING AND OPTIMIZATION USING AN ADAPTIVE DIGITAL CIRCUIT

(75) Inventor: Daniel Mann, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/497,040

(22) Filed: Feb. 3, 2000

Related U.S. Application Data

(62) Division of application No. 09/072,830, filed on May 5, 1998, now Pat. No. 6,275,782.

(51) Int. Cl.$^7$ ................................. G06F 11/34
(52) U.S. Cl. ................. 702/181; 702/179; 702/182; 702/183; 714/724; 714/47
(58) Field of Search ................. 702/181, 182, 702/183, 187, 186, 179; 714/47, 724, 725, 728

(56) References Cited

U.S. PATENT DOCUMENTS

| | | | |
|---|---|---|---|
| 3,812,478 A | 5/1974 | Tomisawa et al. | 340/173 |
| 3,887,869 A | 6/1975 | Connolly et al. | 324/73 |
| 4,115,867 A | 9/1978 | Vladimirov et al. | 364/900 |
| 4,176,402 A | 11/1979 | Sipple | 364/900 |
| 4,219,877 A | 8/1980 | Vladimirov et al. | 364/554 |
| 4,409,592 A | 10/1983 | Hunt | 340/825.5 |
| 4,608,559 A | 8/1986 | Friedman et al. | 340/825.5 |
| 4,694,412 A | 9/1987 | Domenik et al. | 364/717 |
| 5,392,289 A | 2/1995 | Varian | 371/5.4 |
| 5,412,587 A | 5/1995 | Holt et al. | 364/717 |
| 5,557,548 A | 9/1996 | Gover et al. | 364/551.01 |

(List continued on next page.)

FOREIGN PATENT DOCUMENTS

| | | |
|---|---|---|
| GB | 2304215 | 3/1997 |
| WO | WO 99/57640 | 11/1999 |

OTHER PUBLICATIONS

IBM Technical Disclosure Bulletin "Hardware Performance Trade Enhancement to Include Performance Events", vol. 39, No. 10, Oct. 1996, pp. 87–88.

IBM Technical Disclosure Bulletin "Self–Adjusting Utilization Monitor", vol. 38, No. 2, Feb. 1995, pp. 371–372.

(List continued on next page.)

*Primary Examiner*—Marc S. Hoff
*Assistant Examiner*—Paul L Kim
(74) *Attorney, Agent, or Firm*—Zagorin, O'Brien & Graham, LLP

(57) ABSTRACT

A processor-based device supports performance optimization with use of an adaptive digital element. The adaptive digital element generates probability data corresponding to a probability of a performance parameter of the processor-based device. The probability data is repeatedly compared to input data corresponding to the performance parameter and is adapted to match the input data. After a predetermined number of samples, a probability value corresponding to the probability data and stored in a counter of the adaptive digital element converges to a good estimated probability of the performance parameter. The probability value is then detected and processed, and the processor-based device is adapted in accordance with the probability value. A processor of the processor-based device also can adapt system operation when the probability value reaches a predetermined trigger value. One advantage of this overall technique is that it essentially eliminates any prospect of counter overflow and associated interrupt processing. Also, the device can accommodate multiple performance parameters by selecting a particular performance parameter for measurement by the adaptive digital element.

28 Claims, 9 Drawing Sheets

U.S. PATENT DOCUMENTS

| | | | | |
|---|---|---|---|---|
| 5,657,253 | A | | 8/1997 | Dreyer et al. ........... 364/551.01 |
| 5,696,828 | A | | 12/1997 | Koopman, Jr. ................ 380/46 |
| 5,768,152 | A | | 6/1998 | Battaline et al. ........ 364/551.01 |
| 5,768,500 | A | * | 6/1998 | Agrawal et al. ........ 395/184.01 |
| 5,778,194 | A | | 7/1998 | McCombs ................... 395/280 |
| 5,835,702 | A | | 11/1998 | Levine et al. ........... 395/183.15 |
| 5,835,705 | A | | 11/1998 | Larsen et al. ........... 395/184.01 |
| 5,919,268 | A | * | 7/1999 | McDonald .................... 714/47 |
| 6,038,195 | A | * | 3/2000 | Farmwald et al. ........... 365/233 |
| 6,119,075 | A | | 9/2000 | Dean et al. ................. 702/186 |
| 6,275,782 | B1 | * | 8/2001 | Mann ......................... 702/182 |

OTHER PUBLICATIONS

IBM Technical Disclosure Bulletin, vol. 40, No. 1, Processor Performance Monitoring with a Depiction of the Efficiency of the Cache Coherency Protocol of a Superscalar Microprocessor in an Symmetric Multiple Processor Environment', Jan. 1997, pp. 79–81.

Gaines, Brian R., "Stochastic computer thrives on noise", Electronics, vol. 40, No. 14, Jul. 10, 1967, pp. 72–81.

Rohava, S. Ye., "Elements of Stochastic Systems—Instrumentation of Non–Deterministic Learning Patterns", Soviet Automatic Control, vol. 13, No. 5, 1968, pp. 67–69.

Richter, Jeffrey for Microsoft Corporation, "Custom Performance Monitoring for Your Windows NT Applications", copyright 1998, pp. 1–25, http://premium.microsoft.com/msdn/library/periodic/period98/html/layouts_performa_performa_0igj.htm.

Miller, A.J. et al., "A study for an output interface for a digital stochastic computer", Int. J. Electronics, vol. 37, No. 5, 1974, pp. 637–655.

* cited by examiner

PERFORMANCE MONITORING AND OPTIMIZATION USING AN ADAPTIVE DIGITAL CIRCUIT

RELATED APPLICATIONS

This a continuation-in-part of U.S. application Ser. No. 09/072,830, now U.S. Pat. No. 6,275,782, filed May 5, 1998, entitled "Non-Intrusive Performance Monitoring", naming Daniel Mann as inventor.

BACKGROUND OF THE INVENTION

1. Field of the Invention

The present invention generally relates to performance optimization for processor-based devices, and more particularly to adaptive performance optimization for a processor-based device.

2. Description of the Related Art

Most processor-based devices today are equipped with performance monitoring counters, also termed programmable event counters. These counters permit processor performance parameters to be monitored and measured. One current performance monitoring technique utilizes two performance monitoring counters which simultaneously record the occurrence of pre-specified events. When one of the counters overflows, counting stops and an interrupt is generated. A software interrupt handler records the counter values. Post-processing software is used to analyze the gathered data. Based on the observed conditions, the processor-based device optimizes its performance by dynamically changing operating parameters.

A similar performance monitoring technique utilizes multiple programmable event counters to monitor multiple events. The counters typically operate synchronously, are non-intrusive to the operation of the processor, and are externally accessible through a standard Joint Test Action Group (JTAG) interface. An event select register has been used to control the programmable event counters. Examples of processor performance parameters typically measure typically by programmable event counters are cache hits, cache snoops, data reads, data writes, branches, pipeline flushes, executed instructions, locked bus cycles, hardware interrupts, bank conflicts, and I/O cycles.

A significant concern with the above performance monitoring techniques is counter overflow. Counter overflow has typically been addressed through use of larger counters. By increasing the size of a counter, interrupts are generated less frequently. This is desirable since interrupts intrude into normal processor operation. On the other hand, large counters result in greater data averaging. Data averaging is undesirable because data averaging prevents observation of temporary fluctuations in performance parameters. Increasing the size of a counter also increases implementation costs. Thus, varying the size of performance monitoring counters has been a tradeoff. What is needed is a performance monitoring device that does not require a tradeoff as described above.

SUMMARY OF THE INVENTION

Briefly in accordance with the present invention, a processor-based device supports performance optimization with use of an adaptive digital element. The adaptive digital element generates probability data corresponding to a probability of a performance parameter of the processor-based device. The probability data is repeatedly compared to input data corresponding to the performance parameter and adapted to match the input data. After a predetermined number of samples, a probability value corresponding to the probability data aid stored in a counter of the adaptive digital element converges to a good estimated probability of the performance parameter. The probability value is then detected, and the processor-based device is adapted in accordance with the probability value. A processor of the processor-based device also can adapt system operation when the probability value reaches a predetermined trigger value. One advantage of this overall technique is that it essentially eliminates any prospect of counter overflow aid associated interrupt processing. Also, the device can accommodate multiple performance parameters by selecting a particular performance parameter for measurement by the adaptive digital element.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
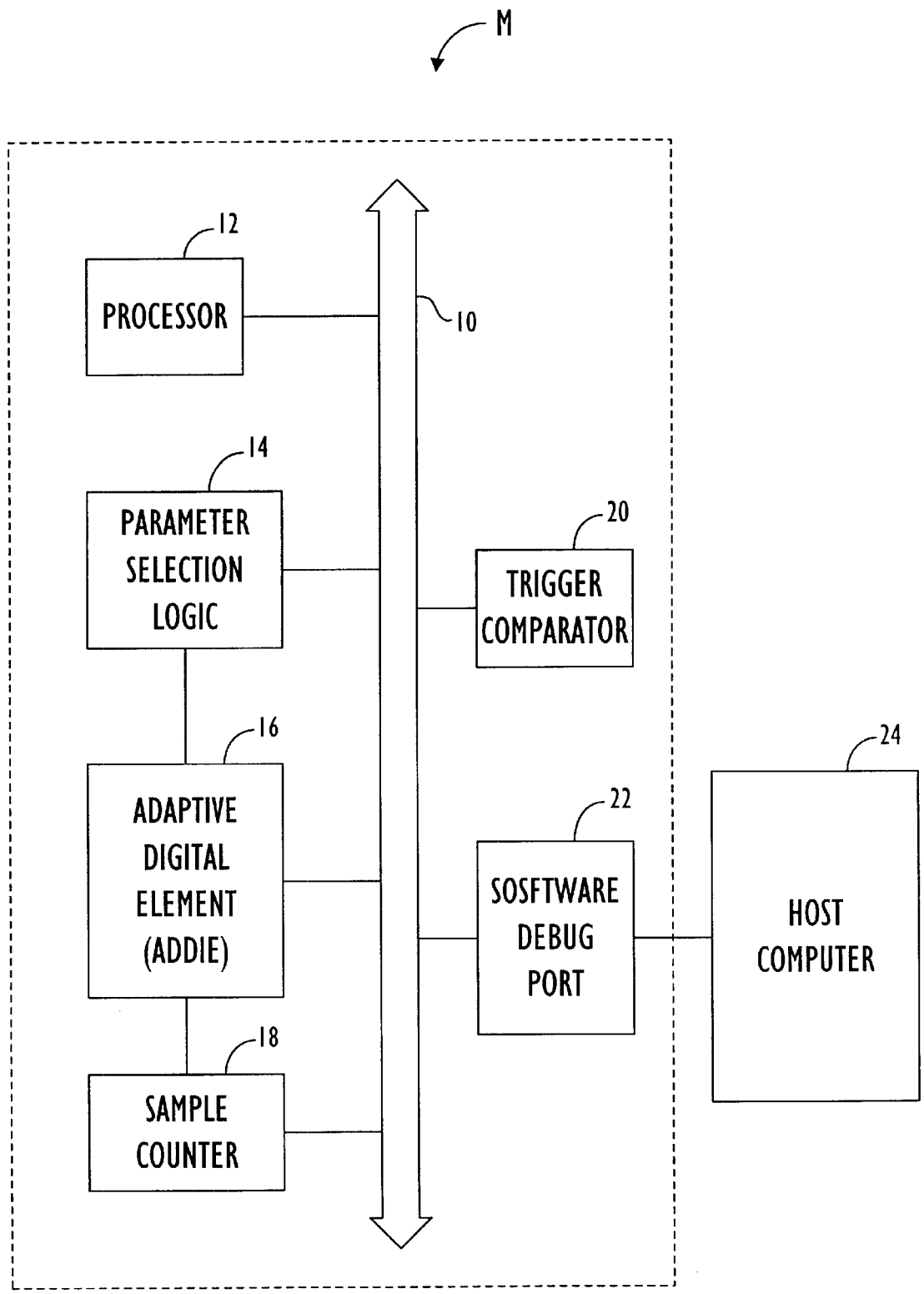
FIG. 1 is a block diagram of a processor-based device including an adaptive digital element here coupled to a host computer through a Software Development Port (SDP) in accordance with the present invention.

Turning now to the drawings, FIG. 1 shows a processor-based device M, such as a microcontroller, in accordance with the invention. The device M includes a system bus 10 coupled to a processor 12, parameter selection logic 14, an adaptive digital element 16, a sample counter 18, a trigger comparator 20, and a Software Development Port (SDP) 22. The SDP 22 is further coupled to a host computer 24 external to the device M. In addition to the system bus 10, the adaptive digital element 16 is directly coupled to the parameter selection logic 14 and the sample counter 18. This configuration of the device M is illustrative. Also, certain typical components of a processor-based device which are not critical to the invention have been omitted for clarity.

The techniques and circuitry according to the invention could be applied to a wide variety of microcontrollers and other similar environments. The term "microcontroller" itself has differing definitions in industry. Some companies refer to a processor core with additional features (such as input/output) as a "microprocessor" if it has no onboard memory, and digital signal processors (DSPs) are now used for both special and general purpose controller functions. As here used, the term "microcontroller" covers all of the products, and generally means an execution unit with added functionality all implemented on a single monolithic integrated circuit.

The device M is configured to provide performance optimization. The adaptive digital element 16 basically gathers and analyzes 3 performance data of the device M. In particular, the adaptive digital element 16 controls a probability or adaptive digital element value representing a probability of a performance parameter or characteristic of the device M. By reading the probability value, the processor 12 can determine a current probability of a performance parameter. Based on the measured probability value, the processor 12 can adapt operation of the device M accordingly. The SDP 22 permits or enables unobtrusive observation of the probability value by the host computer 24 and is an input/output port providing test and debug access to internal registers of the host computer 24 as is known in the art. Via the SDP, a host computer connected to the input/output port, can unobtrusively examine performance parameters.

The sample counter 18 and the trigger comparator 20 are helpful to accomplishing performance optimization. The sample counter 18 tracks the number of samples of performance data gathered by the adaptive digital element 16. As described in more detail below, the probability value controlled by the adaptive digital element 16 approaches a good estimated probability of a performance parameter after a predetermined number of samples. The sample counter 18 allows a determination of whether that predetermined number of samples has been gathered by the adaptive digital element 16. The trigger comparator 20 periodically compares the probability value with a predetermined trigger or critical value. The predetermined trigger value represents an upper or lower threshold of a performance parameter worthy of alerting the processor 12. When the probability value is equal to the predetermined trigger value, the trigger comparator 20 informs the processor 12. The processor 12 can then adapt operation of the device M accordingly. The sample counter 18 can be examined by the host computer 24 via the SDP 22. It should be understood that the sample counter 18 is not critical to the present invention. As an alternative to the sample counter 18, a timer may be provided to measure a predetermined amount of time suitable for the adaptive digital element 16 to be examined by the host computer 24.

Through use of the parameter selection logic 14, the adaptive digital element 16 can measure multiple performance parameters for the device M. The parameter selection logic 14 basically selects a performance parameter stream from multiple performance parameter streams. The performance parameter stream can be derived from a particular signal or register value in the device M. The selected performance parameter stream is provided to the adaptive digital element 16. The probability value is controlled by the adaptive digital element 16 and reflects the probability of the selected performance parameter stream. The adaptive digital element 16 thus can be used to measure the probability of any of the performance parameter streams. When a different performance parameter stream is selected, the sample counter 18 should be reset. If there is only one performance parameter of interest to the device M, the parameter selection logic 14 should not be needed. One embodiment of the parameter selection logic 14 is described below in connection with FIG. 7. It should be understood that the parameter selection logic 14 is not critical to the present invention.

Figure 2:
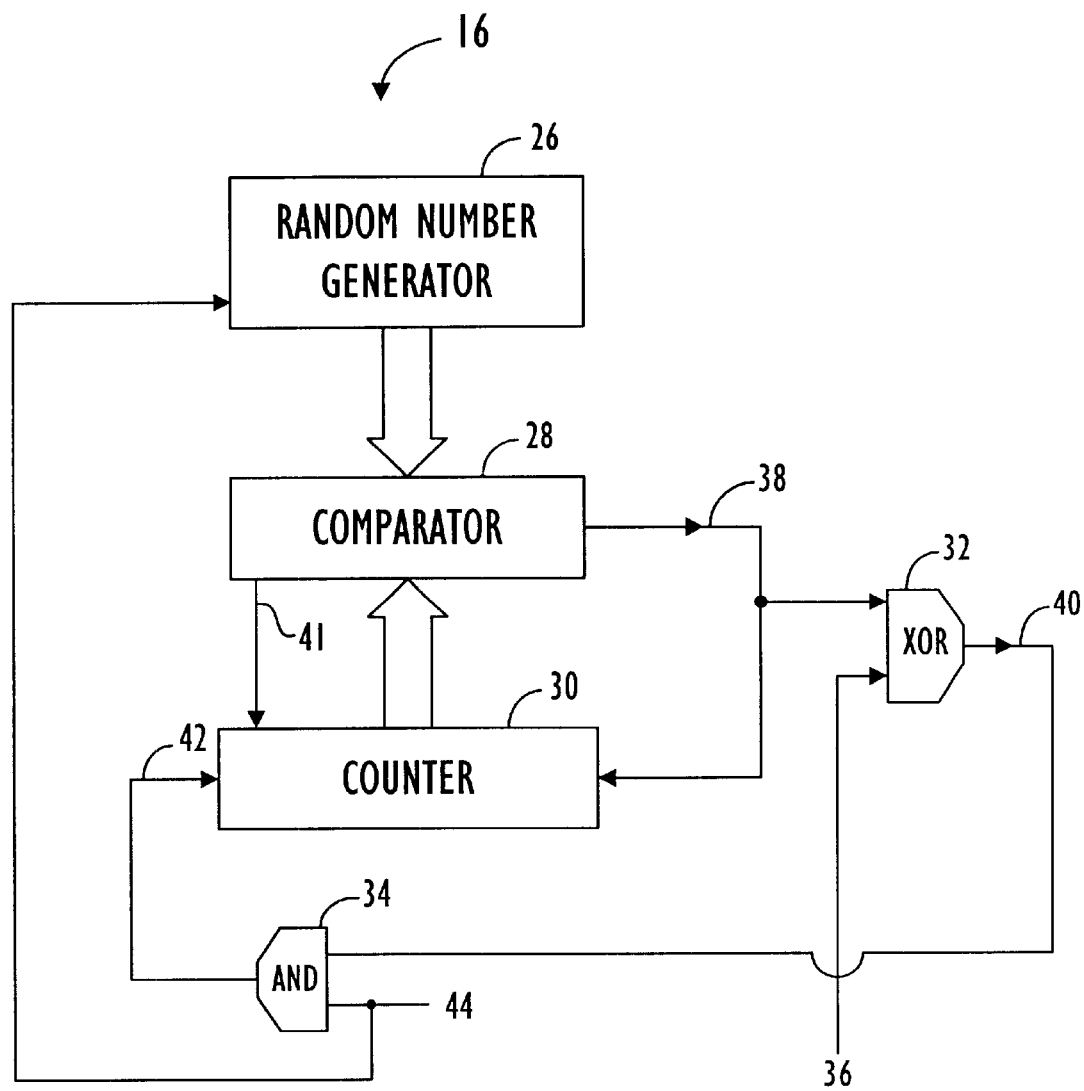
FIG. 2 is a block diagram of an exemplary embodiment of the adaptive digital element of FIG. 1 in accordance with the present invention.

Referring to FIG. 2, an exemplary configuration of the adaptive digital element 16 is shown. The illustrated adaptive digital element 16 includes a random number generator 26, a comparator 28, a counter 30, an XOR gate 32, and an AND gate 34. The counter 30 and the random generator 26 are clocked by a clock signal 44. One embodiment of the random number generator 26 is described below in connection with FIG. 7. The random number generator 26, the comparator 28, and the counter 30 together generate or create a stochastic probability stream 38 corresponding to a probability of the selected performance parameter. Representing a performance parameter as probability data is useful since most performance data is random in nature. The random number generator 28 provides a random number to the comparator 28, and the counter 30 provides a probability value corresponding to a current probability of the performance parameter to the comparator 28. In the disclosed embodiment, the probability value is a multi-bit data sequence having a data size matching the size of the counter 30. Some discussion of adaptive digital elements in connection with digital stochastic computers is provided in an article "A study of an output interface for a digital stochastic computer," A. J. Miller, A. W. Brown, and P. Mars, Int. J. Electronics, 1974, Vol. 37, No. 5, pp. 637–655, which is incorporated herein by reference for background purposes. Adaptive digital elements have commonly been used for computing statistical characteristics of random processes.

The comparator 28 compares the probability value to the random number. If the probability value is greater than the random number, then the comparator 28 outputs a predetermined value, here a "1". If the probability value is less than or equal to the random number, then the comparator 28 outputs another predetermined value, here a "0". Large probability values are therefore more likely to produce a "1" output from the comparator 28 than small probability values. The sequence of bit values provided by the comparator 28 responsive to repeated comparisons of probability values from the counter 30 and random numbers from the random number generator 26 forms the probability data as a stochastic probability stream 38 corresponding to the probability of the performance parameter. The stochastic probability stream 38 is provided to the counter 30 and to the XOR gate 32. The comparator 28 thus is responsible for generating the stochastic probability stream 38.

The input data stream 36 is sampled by the XOR gate 32, and the stochastic probability stream 38 is provided to the XOR gate 32 by the comparator 28. The XOR gate 32 compares the current bit value of the stochastic probability stream 38 to a current bit value of an input data stream 36 corresponding to the performance parameter. The XOR gate 32 outputs a predetermined value, here a "0", when the stochastic probability stream 38 and the input data stream 36 match. When the stochastic probability stream 38 and the input data stream 36 do not match, the XOR gate 32 outputs a different predetermined value, here a "1". The XOR gate 32 basically determines which of the two data streams 36 aid 38 has the higher probability of being "1".

The XOR gate 32 provides a feedback or probability difference signal 40 combined with the clock signal 44 to the counter 30. A clock enable signal 42 provided to the counter 30 is here generated by an AND gate 34 having the feedback signal 40 and the clock signal 44 as its inputs. Based on a control signal 41 from the comparator 28, the clock enable signal 42 causes the counter 30 to increment, decrement, or maintain the probability value. The control signal 41 informs the counter 30 whether to increment, decrement, or maintain the probability value. If the stochastic probability stream 38 is less than the input data stream 36, then the control signal 41 causes the counter 30 to increment the probability value. If the stochastic probability stream 38 is greater than the input data stream 36, then the control signal 41 causes the counter 30 to decrement the probability value. If the stochastic probability stream 38 is equal to the input data stream 36 then the control signal 41 causes the counter 30 to maintain the current probability value. Thus, with each comparison of the stochastic probability stream 38 and the input probability stream 36, the probability value is adjusted to produce a stochastic probability stream 38 which matches the input probability stream 36.

The XOR gate 32 and the comparator 28 together provide a feedback mechanism to assist the counter 30 in controlling or adapting the probability value. Since the probability value stored by the counter 30 corresponds to the stochastic probability stream 38, adapting the probability value as described above in effect adapts the stochastic probability stream 38 to match the input data stream 36. This performance monitoring technique essentially eliminates any prospect of counter overflow and associated interrupt processing. With conventional performance monitoring techniques, interrupt processing associated with counter overflow has been somewhat intrusive. In accordance with the present invention, there is no need for an overflow interrupt handler since the probability value in the counter 30 can be read at any time to give a measure of the current probability of a performance parameter. It should be evident to those skilled in the art that the AND gate 34 and the XOR gate 32 could be replaced with other types of logic gates.

The adaptive digital element 16 thus basically integrates the stochastic probability stream 38 to effectively measure the probability of the selected performance parameter. After the adaptive digital element 16 has gathered a predetermined number of samples from the input data stream 36, the probability value is a good estimated probability of the performance parameter. With each sample of the input data stream 36 or each cycle of the adaptive digital element 16, the stochastic probability stream 38 is converted to the probability value and the probability value converges toward a good estimated probability of the performance parameter. The adaptive digital element 16 serves as a performance monitor which provides continuous on-chip support for the device M. Other configurations of the adaptive digital element 16 to achieve the same or a similar result are possible.

A performance parameter measured by the adaptive digital element 16 can be represented by one or more bits. An example of a performance parameter which can be represented by one bit is cache hit information. A "1" for example might represent a cache hit, and a "0" might represent a cache miss. By integrating the binary sequence of "1"s and "0"s representing cache hits and misses, the adaptive digital element 16 can generate a probability value representing the cache hit ratio. Certain other parameters, such as the number of clocks executed while a pipeline is stalled or the number of cycles needed to access external memory, must be represented by multiple bits. To measure the probabilities of such parameters with the adaptive digital element 16, a maximum range of the parameter must first be set. For example, suppose a maximum range of 10 clocks is set for the performance parameter indicating the number of clocks executed while a pipeline is stalled. Each 10-bit binary sequence for this parameter can be treated as a pulse stream to be serially clocked into the adaptive digital element 16. There is no synchronous requirement for presenting input data to the adaptive digital element 16. In this example, a binary sequence of "0101010101" would indicate 5 clocks were executed while the pipeline was stalled. Based on that binary sequence alone, the adaptive digital element 16 would store a probability value corresponding to 50%. If the probability value, for example is an 8-bit binary sequence (the maximum number derived from an 8-bit binary sequence being 256), then the probability value stored would be "1000000", since that value is the binary sequence representing the number 128. Thus, essentially any performance parameter for the device D can be converted or encoded into a binary sequence to be supplied to the adaptive digital element 16. Those skilled in the art will appreciate that a processor-based device can be associated with a variety of performance parameters.

Figure 3:
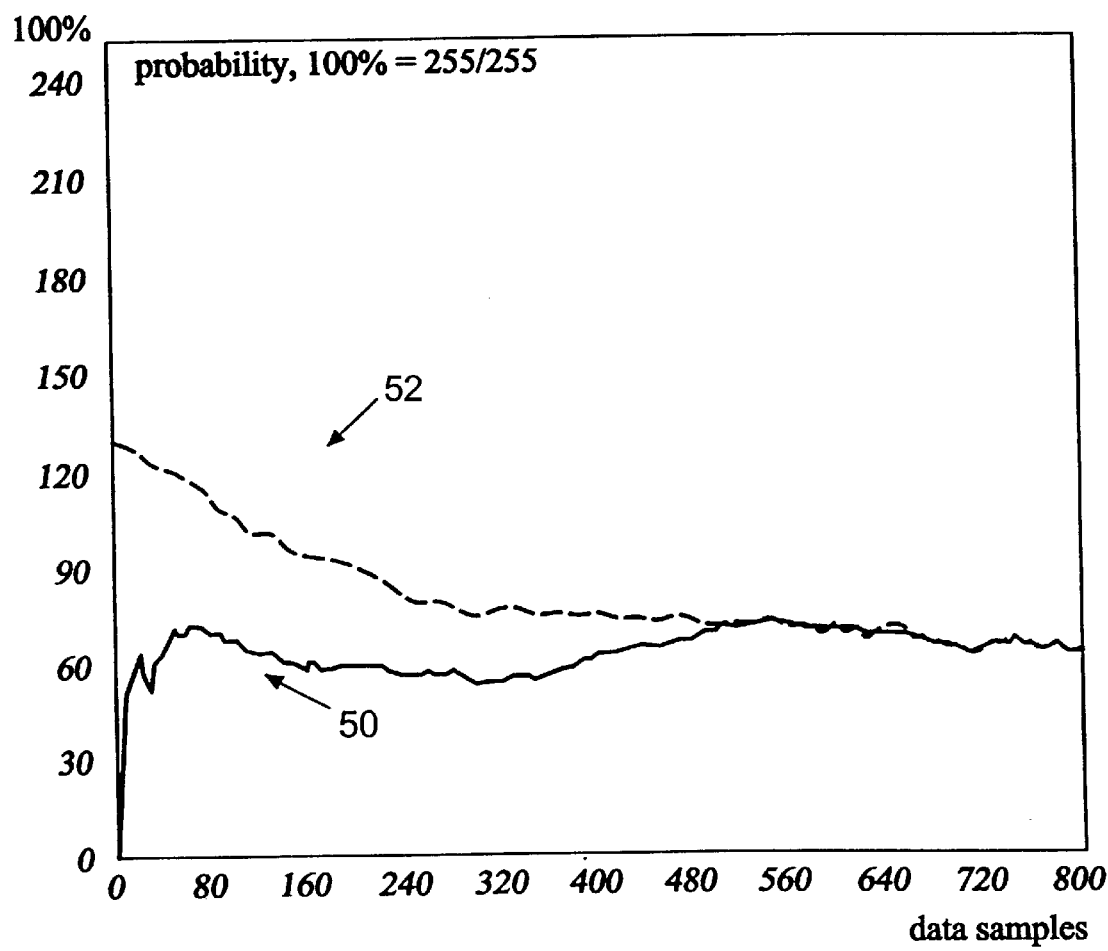
FIG. 3 is a graph illustrating measurement of a probability of 25% over approximately 800 samples by the adaptive digital element of FIG. 2 having an 8-bit counter.

Referring to FIG. 3, measurement of a probability of 25% by the adaptive digital element 16 is shown. For this illustration, the counter 30 is an 8-bit counter. The size of the counter 30 defines the probability of resolution of the adaptive digital element 16. With an 8-bit counter, the probability of resolution is 0.39% (1/255). For FIGS. 3–5, the vertical axis indicates the probability value stored by the adaptive digital element 16, and the horizontal axis indicates the number of samples gathered by the adaptive digital element 16 from the input data stream 36. As can be seen from FIG. 3, approximately 800 samples were gathered by the adaptive digital element 16. The input data stream 36 is represented as a solid data pattern 50, and the stochastic probability stream 38 is represented as a phantom-line data pattern 52. The adaptive digital element 16 was here initialized with a 50% probability value, in this case an 8-bit binary value representing "128". For that reason, the curve 52 is shown equal to a probability value of 128 before the first sample. As can be seen, after approximately 500 samples, the measured data pattern 52 closely tracks the test data pattern 50 and the counter 30 stores approximately a 25% probability value. Thus, when the adaptive digital element 16 includes an 8-bit counter, the predetermined number of samples or the predetermined time preferably corresponds to 500 or more samples to obtain a good estimated probability of the particular performance parameter.

Figure 4:
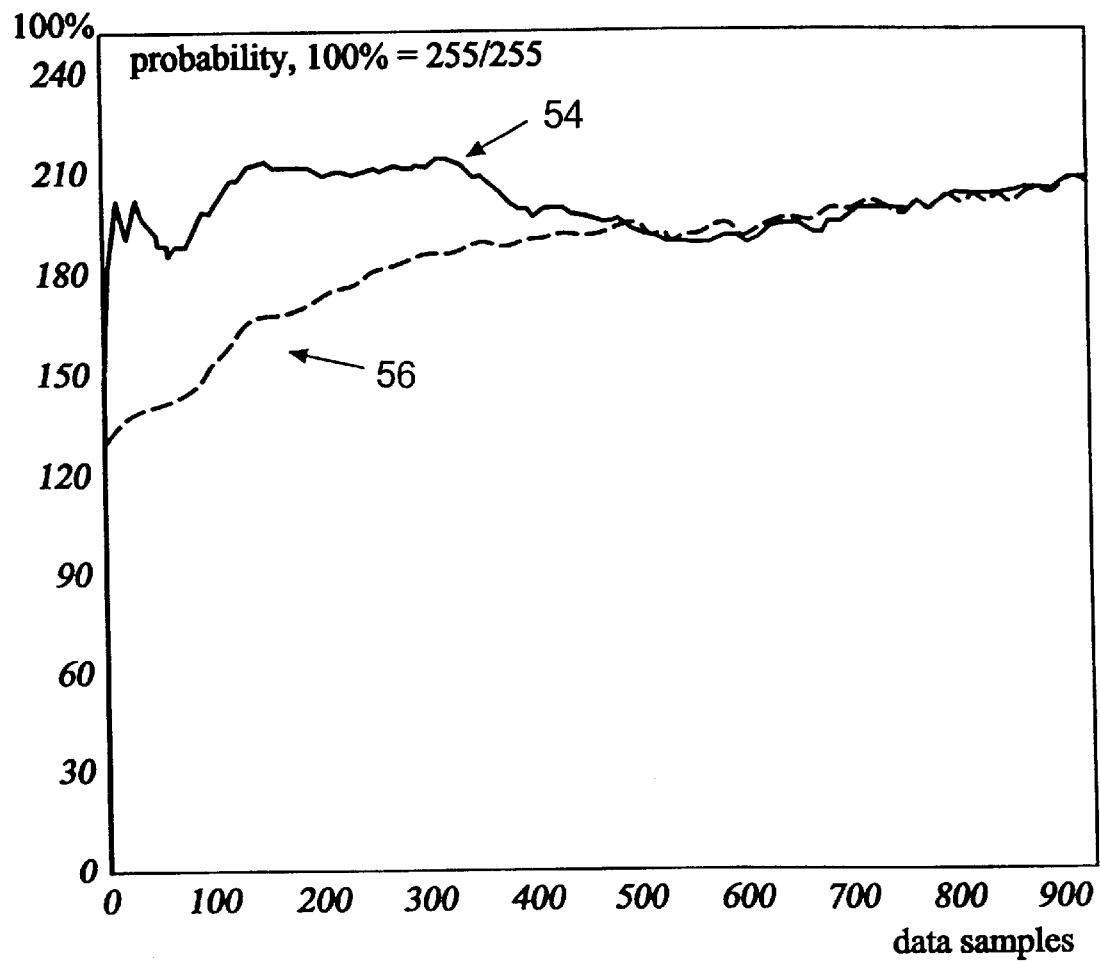
FIG. 4 is a graph illustrating measurement of a probability of 78% over approximately 900 samples by the adaptive digital element of FIG. 2 having an 8-bit counter.

Referring to FIG. 4, measurement of a probability of 78% by the adaptive digital element 16 is shown. Here again, the counter 30 is an 8-bit counter. For this example, the adaptive digital element 16 was also initialized with a 50% probability value. As can be seen, approximately 900 samples were gathered by the adaptive digital element 16. The input data stream 36 is represented by a solid data pattern 54, and the stochastic probability stream 38 is represented by a phantom-line data pattern 56. As can be seen, after approximately 500 samples, the measured data pattern 56 closely tracks the test data pattern 54 and the counter 30 stores approximately a 78% probability value. FIGS. 3 and 4 together thus illustrate that the adaptive digital element 16 can measure any probability of a performance parameter.

Figure 5:
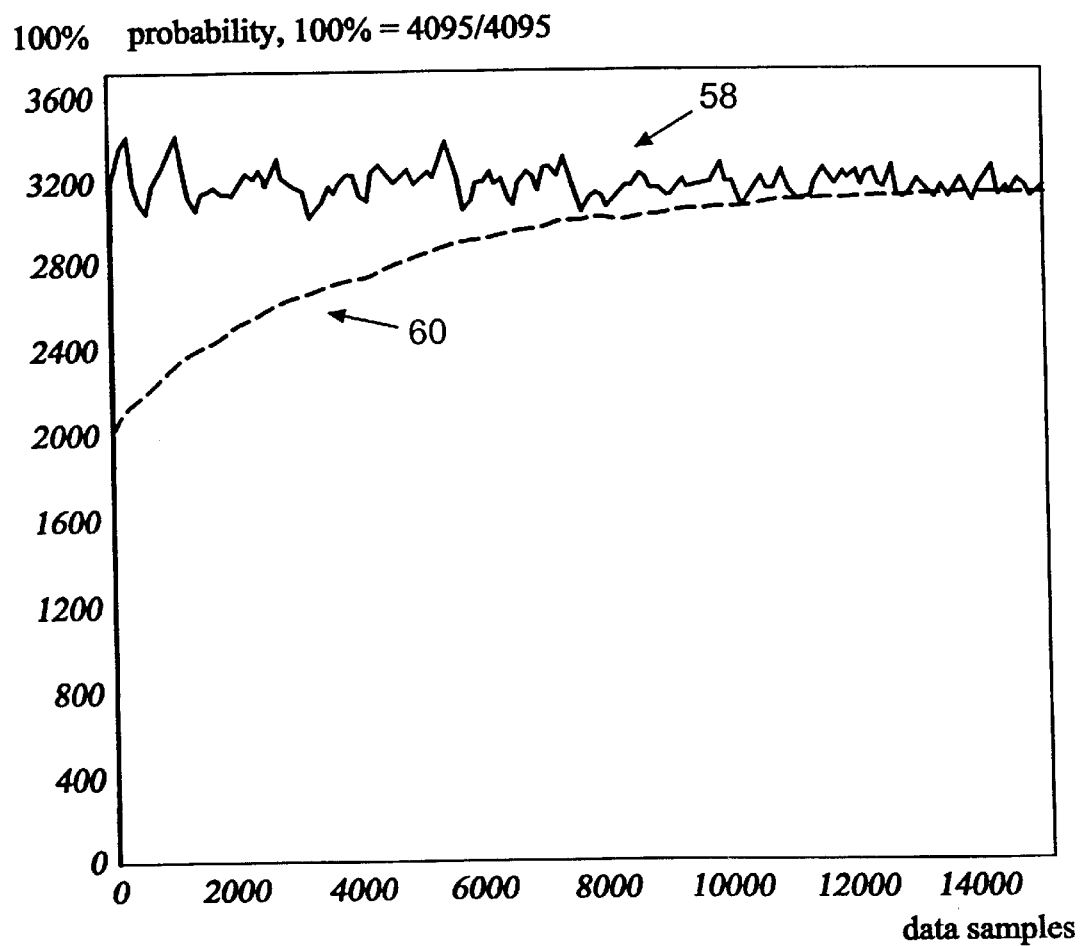
FIG. 5 is a graph illustrating measurement of a probability of 78% over approximately 1400 samples by the adaptive digital element of FIG. 2 having a 12-bit counter.

Referring to FIG. 5, measurement of a probability of 78% by the adaptive digital element 16 is shown. While counter 30 for FIGS. 3 and 4 was an 8-bit counter, the counter 30 here is a 12-bit counter. According to an embodiment, the size of the counter 30 may vary. Because of the increased counter size, the adaptive digital element 16 here has a higher probability of resolution. Increasing the probability of resolution of the adaptive digital element 16 slows down the integration process. More data samples therefore are necessary here before the stochastic probability stream 38 adequately tracks the input data stream 36. Also, while an 8-bit counter takes 256 clocks to increment through its full range, a 12-bit counter takes 4096 clock pulses to cover its complete range. As can be seen, approximately 14,000 samples were gathered by the adaptive digital element 16.

In this example, the input data stream 36 is represented by a solid data pattern 58, and the stochastic probability stream is represented by a phantom-line data pattern 60. The adaptive digital element 16 here was initialized with a 50% probability value (2048). As can be seen, about 10,000 samples were required before the measured data pattern 60 tracked or converged with the test data pattern 58 and the counter 30 stored approximately a 78% probability value. Compared to an adaptive digital element 16 with a larger counter, an adaptive digital element 16 with a smaller counter more quickly converges to a required value and better tracks local fluctuations of performance data. One approach to achieving flexibility in the size of the probability value is to allow dynamic selection of the number of bits in the counter 30 which will represent the probability value. In this way, the size of the probability value may be easily adjusted to the desired responsiveness and the desired resolution.

Figure 6:
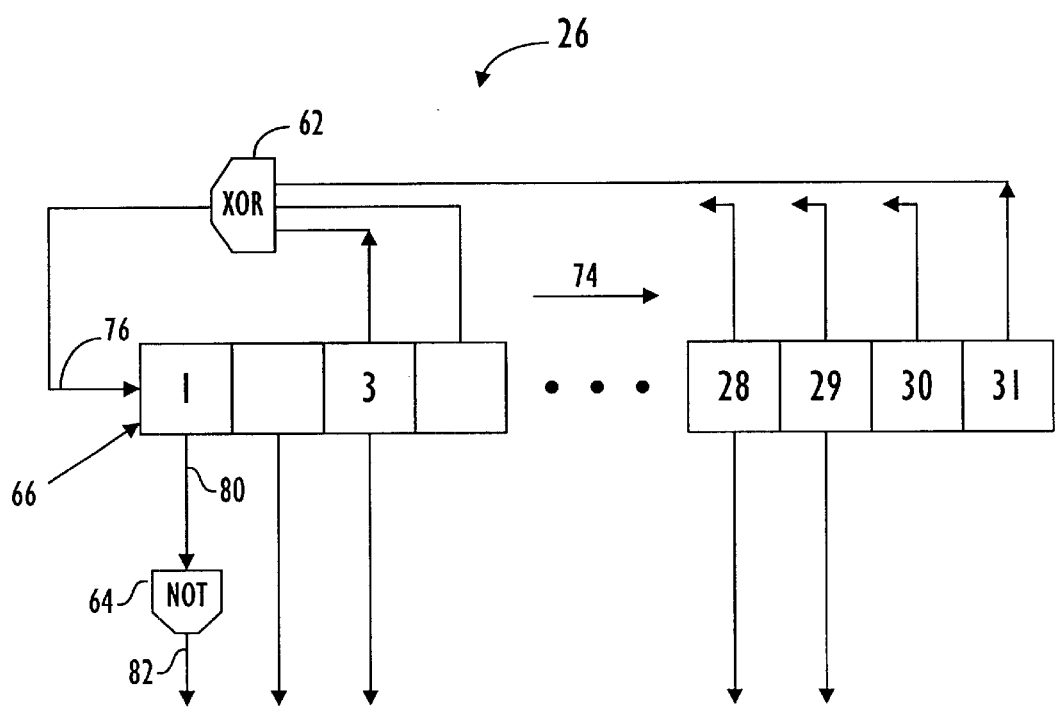
FIG. 6 is a block diagram of an exemplary embodiment of the random number generator of FIG. 2.

Referring to FIG. 6, an exemplary configuration of the random number generator 26 is shown. The random number generator 26 is shown including a shift register 66, an XOR gate 62, and a NOT gate 64. The shift register 66 illustrated is a 32-bit shift register. Each bit represents a stage of the shift register 66. The random number generator 26 is configured to generate correlated or pseudorandom numbers. Compared to purely random numbers, the correlated random numbers accelerate convergence of the probability value stored by the adaptive digital element 16 to its intended or desired value. The random numbers generated by the random generator 26 are correlated in the sense that the next-to-most significant bit of a random number is the inversion of the most significant bit of its previous random number. This is accomplished here by using the NOT gate 64 to invert the most significant bit of a current random number to generate a next-to-most significant bit of a next random number. Here, a bit "0" signal 80 is inverted by the NOT gate 64 to create a signal 82 that sets the next-to-most significant bit of a next random number.

The XOR gate 62 is used in connection with the shifting operation for the shift register 66. In this example, bits 2 through bit 31 are inputs to the XOR gate 62. An output 76 of the XOR gate 62 is shifted as an input into the most significant bit of the shift register 66. When bits 2 through 31 match, the output 76 is set to "0". When bits 2 through 31 do not match, the output 76 is set to "1". As can be seen by an arrow 74 indicating the shift direction, the shift register 66 is shifted left to right or toward a less significant bit from a more significant bit. It should be understood that any combination of consecutive stages of the shift register 66 can be selected for use in generating correlated random numbers. The pseudorandom number sequence generated by the random number generator 26 is more deterministic than a generic random number sequence. It should be understood that other implementations of the random number generator 26 are possible.

Figure 7:
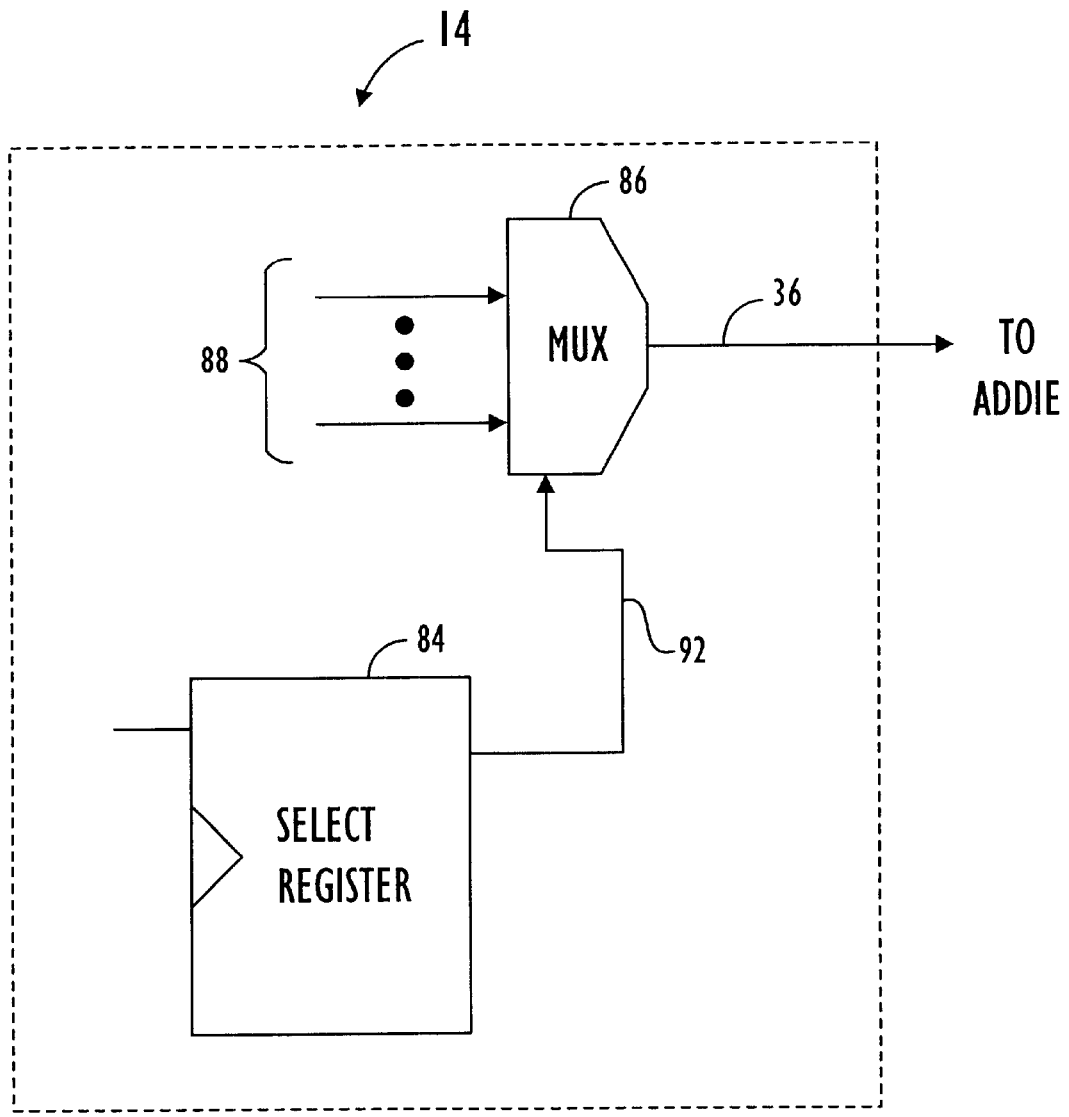
FIG. 7 is a block diagram of an exemplary embodiment of the parameter selection logic of FIG. 1.

Referring to FIG. 7, an exemplary embodiment of the parameter selection logic 14 is shown. The parameter selection logic 14 includes a multiplexer 86 coupled to a select register 84. The select register 84 provides a control signal 92 to the multiplexer 86. The control signal 92 determines the selection or assignment by the multiplexer 86 of a parameter data stream from the multiple parameter data streams 88. The selected parameter data stream 36 is provided or fed to the adaptive digital element 16. The parameter selection logic 14 thus determines which performance parameter is selected for measurement by the adaptive digital element 16.

Figure 8:
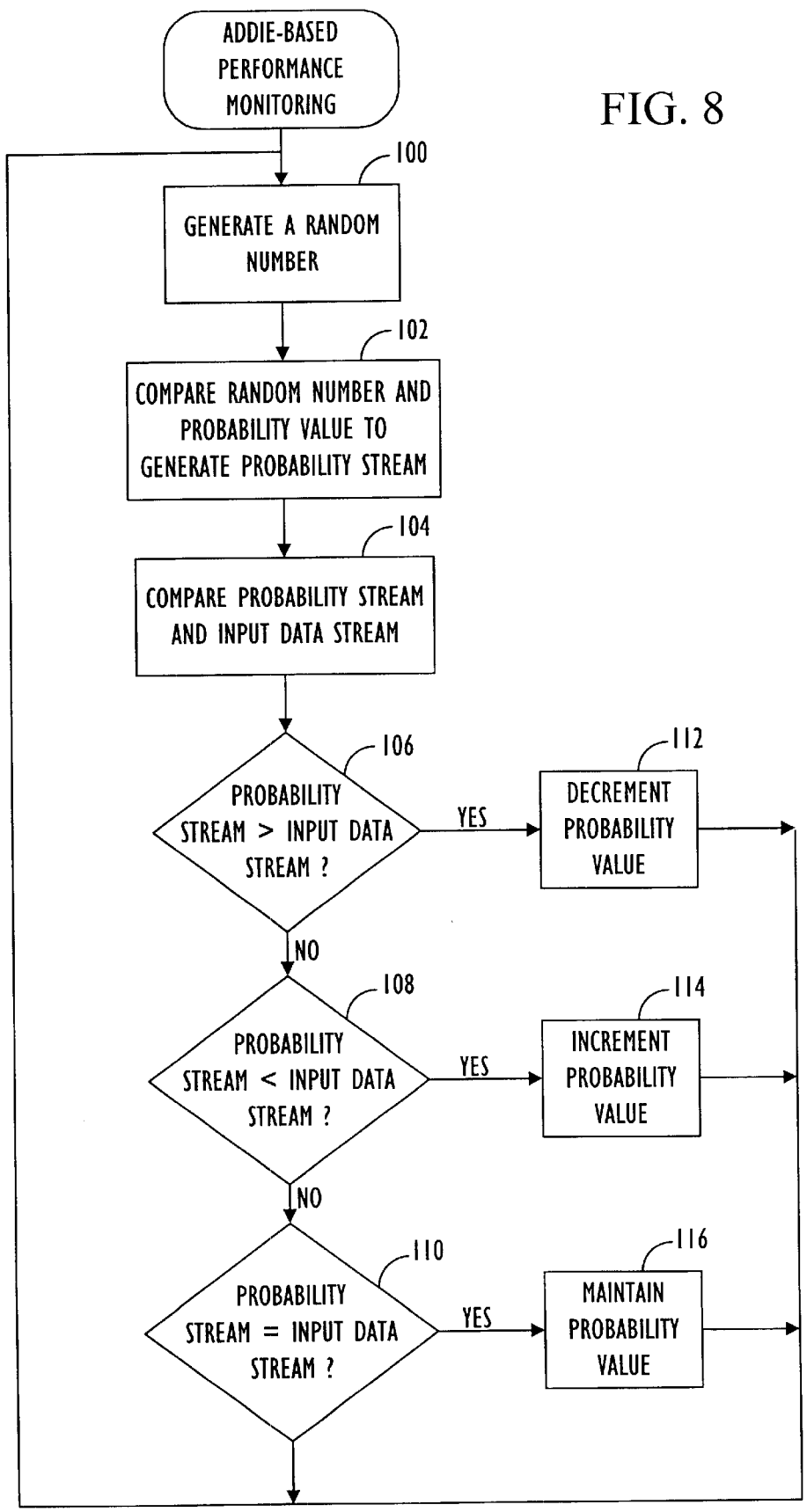
FIG. 8 is a flowchart of an exemplary adaptive digital element-based performance monitoring process according to the adaptive digital element of FIGS. 1 and 2.

Referring to FIG. 8, an exemplary performance monitoring process using the adaptive digital element 16 is shown. Beginning in step 100, a random number is generated in the way described above in connection with FIGS. 2 and 6. The process next proceeds to step 102 where the random number is compared to the probability value to generate the stochastic probability stream 38 as described above in connection with FIG. 2. Next, in step 104, the stochastic probability stream 38 is compared to the input data stream 36 as described above. From step 104, control passes to step 106 where it is determined if the current value of the stochastic probability stream 38 is greater than the current value of the input data stream 36. If so, then the probability value stored by the counter 30 is decremented in step 112. If not, then control proceeds to step 108 where it is determined if the current value of the stochastic probability stream 38 is less than the current value of the input data stream 36. If so, then the probability value is incremented in step 114. If not, then control passes to step 110 where it is determined if the current value of the stochastic probability stream 38 is equal to the current value of the input data stream 36. If so, then the current probability value is maintained. Steps 106–116 together ensure that the stochastic probability stream 38 matches the input data stream 36. From steps 112, 114, and 116, control returns to step 100 for another cycle of the adaptive digital element 16. As described above in connection with FIG. 2, steps 106–116 involve various signals provided between the counter 30, the XOR gate 62, and the comparator 28.

Figure 9:
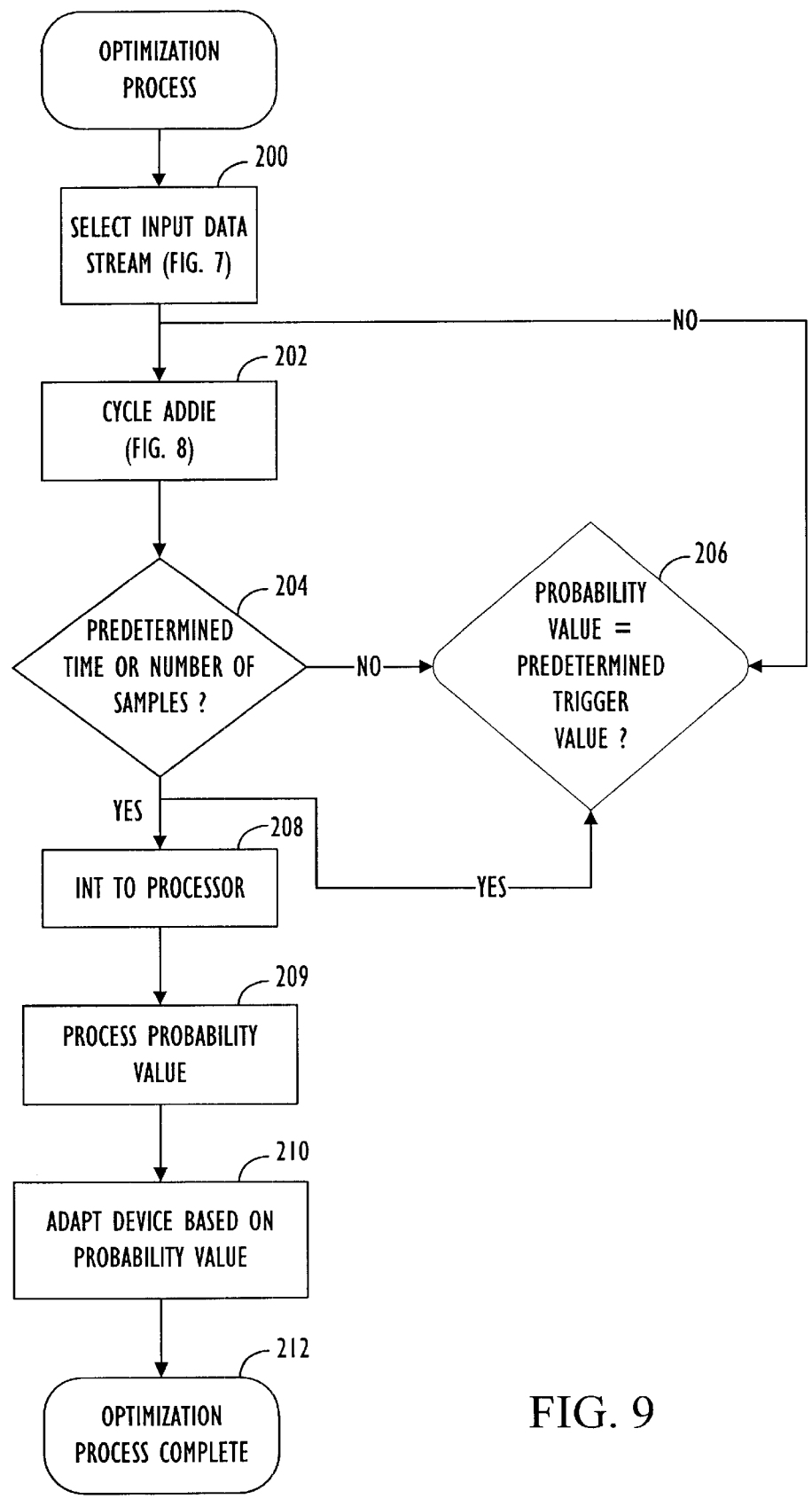
FIG. 9 is a flowchart of an exemplary performance optimization process according to the logic of FIGS. 1, 2, 6, and 7.

Referring to FIG. 9, an exemplary performance optimization process in accordance with the invention is shown. Beginning in step 200, the input data stream 36 is selected (FIG. 7). As indicated above, the input data stream 36 corresponds to a selected performance parameter. Next, in step 202, the adaptive digital element 16 is cycled as described in connection with FIG. 8. From step 202, control proceeds to step 204 where it is determined if the adaptive digital element 16 has gathered a predetermined number of samples or if a predetermined amount of time has passed. A determination of whether a predetermined number of samples have been generated can be made by checking the sample counter 18 (FIG. 1). If the predetermined number of samples has not been reached and a predetermined amount of time has not passed, then control passes to step 206. In step 206, it is determined if the probability value is equal to a predetermined trigger value. This determination can be made using the trigger comparator 20 (FIG. 1). If the probability value is not equal to the predetermined trigger value, then control returns to step 202 where the adaptive digital element 16 is again cycled. If the probability value is equal to the predetermined trigger value in step 206 or if the adaptive digital element 16 has gathered the predetermined number of samples in step 204, then control proceeds to step 208. In step 208, detection of the probability value is indicated to the processor 12. This operation can involve sending an interrupt to the processor 12. The processor 12 in response processes the probability value in step 209. The probability value can be processed by use of software or hardware.

Next, in step 210, the processor 12 adapts the device M based on the probability value. For example, if the probability value indicates that cache hits are too low or high, then the processor 12 can enable or disable prefetching by the particular cache of the device M. Another example involves performance optimization of a memory interface write buffer for a processor-based device. A probability value can represent read merges associated with read accesses to the write buffer. A read merge occurs when a read request "hits" a word that currently exists in the write buffer. Alternatively, a probability value can represent write merges associated with write accesses to the write buffer. A write merge occurs when data associated with a write request already exists in the write buffer. A probability value could also represent read-around-write events for the write buffer. A read-around-write event is where a read request to memory occurs ahead of (or around) write requests waiting in the write buffer. Based on a measured probability value representing a performance parameter like those examples given above, the processor 12 can adjust the policy for the write buffer. For example, the processor 12 can cause data to sit in the write buffer for a longer or shorter period of time by selectively enabling and disabling various features of the write buffer. Three examples of such features are write merge support, read merge support and read ahead support. By adjusting the write buffer policy in accordance with the measured probability value, the write buffer can produce its best performance. Those skilled in the art will appreciate that a variety of feedback responses are possible. The optimization process is completed in step 212. The disclosed optimization process is equally applicable to single-bit and multiple-bit performance parameters.

The foregoing disclosure and description of the preferred embodiment are illustrative and explanatory thereof, and various changes in the components, circuit elements, circuit configurations, counter size, gate types, register size, performance parameters, random number generation techniques, stochastic processing techniques, feedback responses, and signal connections, as well as in the details of the illustrated circuitry and construction and method of operation may be made without departing from the spirit and scope of the invention.

What is claimed is:

1. A processor-based device comprising:
   a processor; and
   an adaptive digital element coupled to the processor, the adaptive digital element coupled to receive input data corresponding to a performance parameter of the processor-based device, generate probability data corresponding to a probability of the performance parameter, and adapt the probability data to converge on the input data.

2. The processor-based device recited in claim 1 wherein the processor responds to the probability data and adapts operation of the processor-based device in accordance with a probability value related to the probability data.

3. The processor-based device recited in claim 2 wherein the adaptive digital element comprises:
   a random number generator to provide a random number;
   a counter to hold and adapt the probability value so that the probability data matches the input data;
   a comparator coupled to the counter and the random number generator to compare the probability value to the random number and generate the probability data; and
   an XOR gate coupled to the comparator to compare the probability data and the input data and generate a probability difference signal fed to the counter.

4. The device of claim 3 wherein the counter is a variable-size counter, the variable-size counter being programmably selectable.

5. The device of claim 3 wherein the counter is a variable-size counter that allows adjustment of a number of data samples required for the probability data to track the input data.

6. The device of claim 3, wherein the random number generator comprises:
   a shift register; and
   correlation logic coupled to the shift register to configure the shift register to generate correlated random numbers.

7. The device of claim 6 wherein the correlation logic, includes:
   a NOT gate to invert the most significant bit of a current random number to generate a next-to-most significant bit of a next random number.

8. The device of claim 1, further comprising:
   a trigger comparator coupled to the adaptive digital element to generate an interrupt to the processor when the probability value equals a predetermined trigger value.

9. The device of claim 1, further comprising:
   parameter selection logic coupled to the adaptive digital element to select the input data corresponding to a performance, parameter from a plurality of streams of input data corresponding to a plurality of performance parameters.

10. The device of claim 1, further comprising:
    a software development port coupled to the adaptive digital element to enable observation of the probability value by a host computer.

11. The device of claim 1, further comprising:
    a sample counter coupled to the adaptive digital element to track a number of samples within the input data gathered by the adaptive digital element.

12. A hardware-implemented method of performance optimization for a processor-based device, comprising:
    generating probability data corresponding to a probability of a performance parameter for a processor-based device;
    sampling input data corresponding to the performance parameter;
    comparing the input data to the probability data;
    adapting the probability data based on the comparing to converge on the probability of the performance parameter after repeated sampling and comparing.

13. The method of claim 12 wherein the generating includes:
    comparing a probability value corresponding to the probability data with a random number.

14. The method of claim 12 wherein the generating includes:
    generating a random number for comparison to a probability value corresponding to the probability data, the random number being correlated to drive the probability value to a mean value.

15. The method of claim 12 wherein the adapting includes incrementing a probability value corresponding to the probability data if the probability data is less than the input data.

16. The method of claim 12 wherein the adapting includes decrementing a probability value corresponding to the probability data if the probability data is greater than the input data.

17. The method of claim 12 wherein the adapting further includes maintaining a probability value corresponding to the probability data if the probability data equals the input data.

18. The method of claim 12 wherein after the repeating a probability value corresponding to the probability data is a good estimated probability of the performance parameter.

19. The method of claim 12, further comprising:
determining whether the sampling and comparing has been repeated sufficiently to allow the probability data to converge on the probability of the performance parameter.

20. The method of claim 12 further comprising:
selecting input data corresponding to a performance parameter for the sampling from among a plurality of streams of input data corresponding to a plurality of performance parameters.

21. The method of claim 12 wherein the processor-based device includes a processor, the method further comprising:
detecting a probability value corresponding to the probability data, wherein the probability value is converged to a good estimated probability of the performance parameter;
generating an interrupt to inform the processor of detection of the probability value; and
adapting the processor-based device in accordance with the probability value.

22. The method of claim 12 wherein the processor-based device includes a processor, the method further comprising:
generating an interrupt to inform the processor of detection of the probability value corresponding to the probability data when the probability value reaches a predetermined trigger value.

23. The method of claim 12 wherein a probability value corresponding to the probability data converges toward a good estimated probability of the performance parameter with each adapting.

24. A processor-based device comprising:
a processor; and
an adaptive digital element accessible to the processor, the adaptive digital element including:
first logic to compare probability data corresponding to a probability of a performance parameter of the processor-based device to input data corresponding to the performance parameter; and
second logic coupled to the first logic to adjust the probability data to match the input data, the second logic holding a probability value corresponding to the probability data to converge toward a good estimated probability of the performance parameter,
the processor adapting device operation in accordance with the probability value.

25. The processor-based device of claim 24, wherein the first logic comprises an XOR gate.

26. The device of claim 24, wherein the second logic comprises a counter.

27. The device of claim 24 wherein the adaptive digital element includes:
third logic to generate the probability data.

28. The device of claim 27, wherein the third logic comprises a random number generator and a comparator.

* * * * *